(12) United States Patent
Feldstein et al.

(10) Patent No.: US 8,195,091 B2
(45) Date of Patent: Jun. 5, 2012

(54) RF AUDIO DISTRIBUTION SYSTEM INCLUDING IR PRESENCE DETECTION

(75) Inventors: George Feldstein, Cresskill, NJ (US); Frankie Chow, Piscataway, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 188 days.

(21) Appl. No.: 12/732,546

(22) Filed: Mar. 26, 2010

(65) Prior Publication Data

US 2010/0290788 A1    Nov. 18, 2010

Related U.S. Application Data

(63) Continuation-in-part of application No. 12/466,854, filed on May 15, 2009.

(51) Int. Cl.
*H04B 7/00* (2006.01)

(52) U.S. Cl. ............ 455/41.2; 455/414.2; 455/414.3; 381/77

(58) Field of Classification Search ........... 455/41.1, 455/42, 414.2, 414.3, 456.1, 456.2, 73; 381/77
See application file for complete search history.

(56) References Cited

U.S. PATENT DOCUMENTS

| | | | |
|---|---|---|---|
| 7,016,325 B2 | 3/2006 | Beasley | |
| 7,151,764 B1 | 12/2006 | Heinonen | |
| 7,509,417 B1 * | 3/2009 | Kammer et al. | 709/225 |
| 2002/0142771 A1 | 10/2002 | Saifullah | |
| 2004/0106377 A1 * | 6/2004 | Van Der Winkel et al. | 455/41.2 |
| 2009/0028568 A1 * | 1/2009 | Flachs et al. | 398/106 |
| 2009/0125984 A1 | 5/2009 | Bilger | |

* cited by examiner

*Primary Examiner* — Tuan H Nguyen
(74) *Attorney, Agent, or Firm* — Crestron Electronics Inc.

(57) ABSTRACT

A teacher microphone (30) is provided with an infrared (IR) transmitter to signal a connection request to a wireless audio access point (50) using a first IR request inquiry signal (331). In response to this first IR code, the wireless audio access point establishes a first RF communication link (300). After the first RF communication link is established, the teacher microphone conditionally transmits a first IR presence signal (332) to verify that it is still collocated in the local vicinity of the wireless audio access point, such as being in the same room. The wireless audio access point is capable of maintaining a connection with additional portable wireless devices, such as a student microphone (40).

21 Claims, 10 Drawing Sheets

Received IR pulse

FIG. 11

RF AUDIO DISTRIBUTION SYSTEM INCLUDING IR PRESENCE DETECTION

CROSS REFERENCE TO RELATED APPLICATIONS

This application is a continuation-in-part of pending application U.S. Ser. No. 12/466,854, filed on May 15, 2009, and which is hereby incorporated by reference.

BACKGROUND OF THE INVENTION

1. Technical Field

The present invention relates to networks of devices that can be connected using wireless links. Specifically, embodiments of the present invention pertain to a method and system for selecting and connecting to wireless access point within a local area network.

2. Background Art

Figure 1:
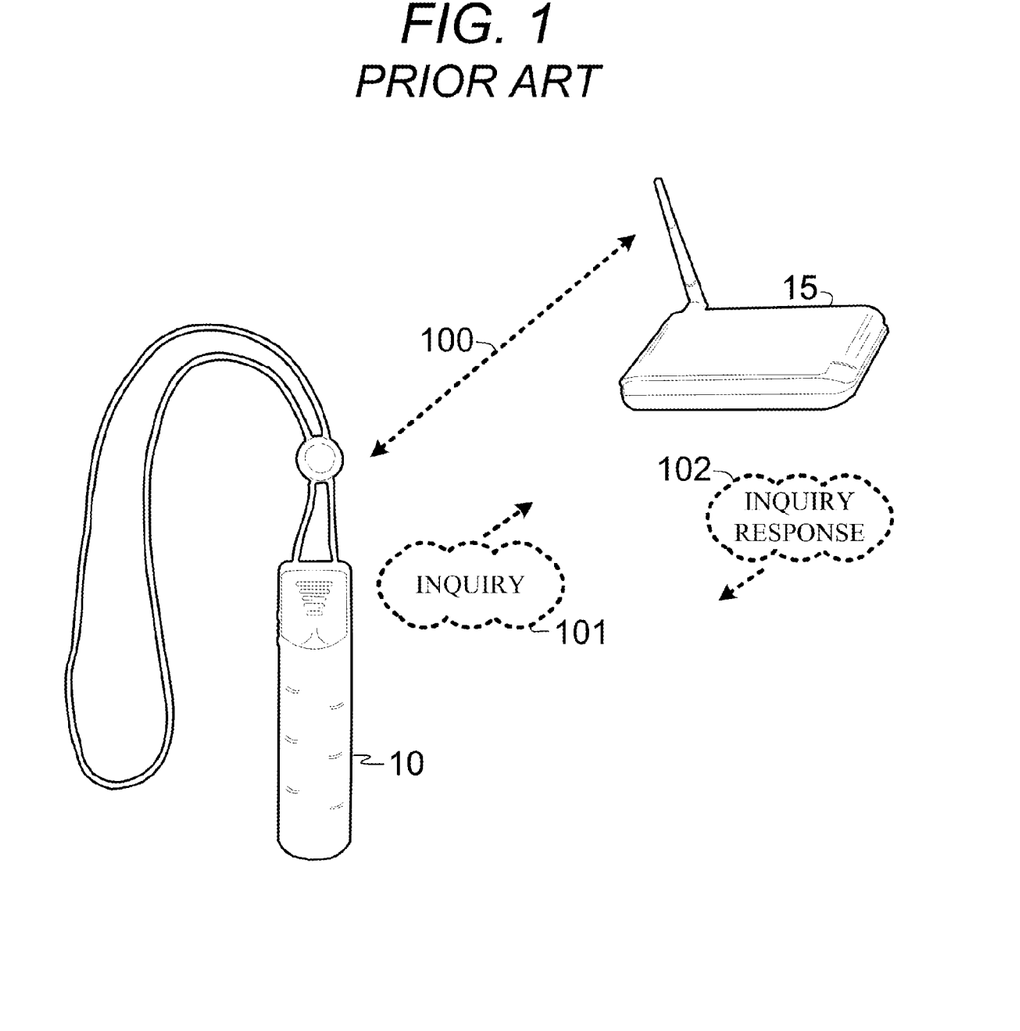
FIG. 1 depicts a wireless microphone using radio frequency (RF) to transmit an audio signal to a wireless audio access point.

Prior art FIG. 1 depicts a wireless radio frequency (RF) microphone 10 that is sending audio, via a Bluetooth® RF communication link 100, to a wireless audio access point 15. Bluetooth is a trademark of Bluetooth SIG, Inc. This application is suitable for a teacher, using this wireless RF microphone 10, to address students in a classroom setting. Audio distribution using wireless RF communication is well understood in the prior art. Similar transmission methods using alternative RF communication protocols are also well understood in the art. For example, Wi-Fi® devices communicate using the IEEE 802.11 standards. Wi-Fi is a trademark of the Wi-Fi Alliance. It is also well known in the prior art to use IEEE 802.11 in conjunction with Internet Protocol to wirelessly transmit audio data, such as in Voice over Internet Protocol (VoIP) applications.

One recent advance in wireless RF communication is Wi-Fi Direct, a wireless standard that allows Wi-Fi devices to communicate directly with each other without the need for a router. This peer-to-peer communication standard can be implemented in any Wi-Fi device. Those skilled in the art will recognize the advantages of transmitting audio data directly from a wireless microphone to a wireless audio access point in accordance with the Wi-Fi Direct specification.

Wireless RF communication can be established by a device, such as a microphone 10, by first broadcasting an inquiry message 101 to a wireless audio access point, such as an audio distribution point 15, which responds by broadcasting an inquiry response message 102.

Figure 2:
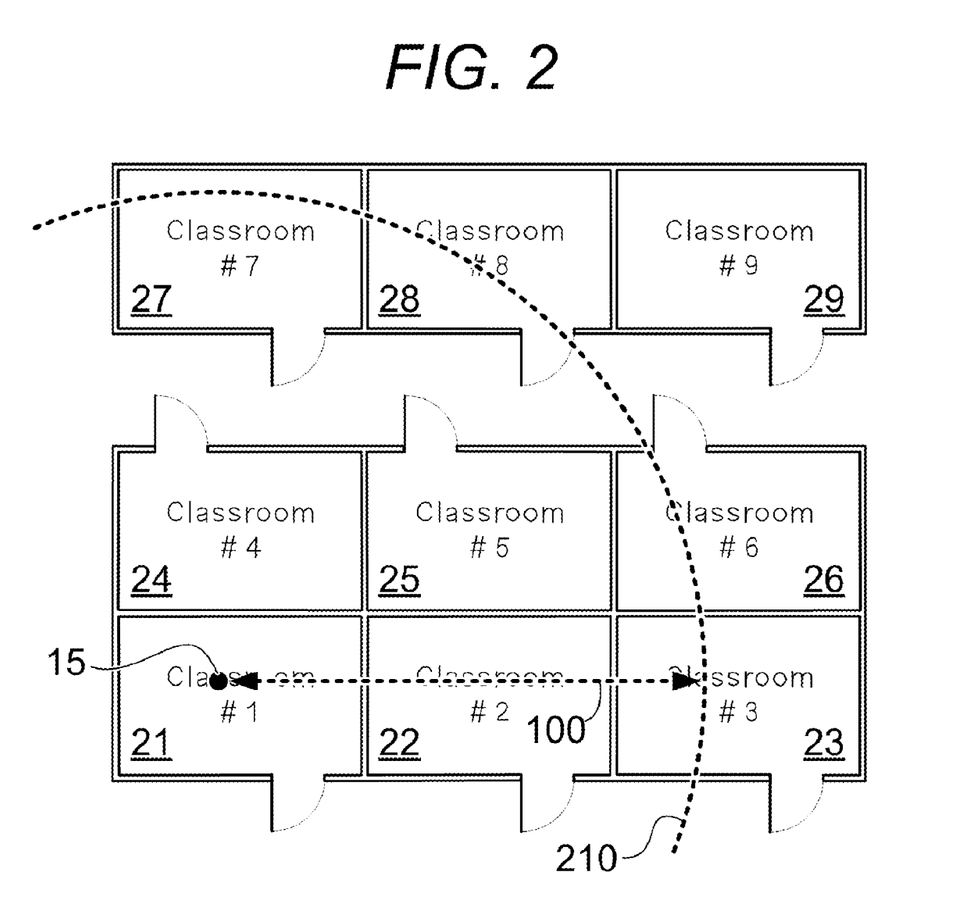
FIG. 2 depicts a portion of a school building having several classrooms and with the wireless range of a typical wireless RF device thereupon superimposed.

FIG. 2 depicts a portion of a school building having several classrooms with the range of a typical wireless device thereupon superimposed. This clearly shows that in a school setting, the range 210 of a typical wireless device, such as wireless audio access point 15, located in a first classroom 21 extends well beyond the confines of that classroom. As shown, the wireless audio access point 15 located in the first classroom 21 would try to establish RF communication 100, with any compatible wireless devices located in a second classroom 22, a fourth classroom 24, and a fifth classroom 25. The wireless audio access point 15 also potentially interacts with some portion of the devices in a third classroom 23, a sixth classroom 26, a seventh classroom 27, and an eighth classroom 28. In fact, in the typical school layout illustrated only devices in a ninth classroom 29 would not interact with the wireless audio access point 15 in the first classroom 21.

The prior art does not provide an effective means of limiting wireless communications to the confines of a single classroom. The problems associated with employing a wireless microphone device in a multiple classroom setting are compounded when multiple wireless microphones are employed. For example, envision a classroom setting with both a teacher microphone and multiple student microphones. The solution to the original problem must now take into account the additional issues of interference, coordination and interoperability.

SUMMARY OF THE INVENTION

It is to be understood that both the general and detailed descriptions that follow are exemplary and explanatory only and are not restrictive of the invention.

DISCLOSURE OF INVENTION

Accordingly, a need exists for a classroom audio system that allows teachers and students to move between several classrooms with each teacher and student retaining use of his own personal wireless microphone. The embodiments of the present invention provide these advantages and others not specifically mentioned above but described in the sections to follow.

According to a first aspect, the present invention provides a wireless communication system comprising two portable wireless devices and a wireless communication access point. The first portable wireless device comprises a radio frequency (RF) digital transceiver and a first infrared (IR) transmitter adapted to transmit a first IR request inquiry signal and a first IR presence signal. The second portable wireless device comprises a RF digital transceiver and a second IR transmitter adapted to transmit a second IR request inquiry signal and a second IR presence signal. The wireless communication access point comprises two RF digital transceivers, each digital transceiver communicating with a corresponding portable wireless device, and an IR sensor that receives the first and second IR request inquiry signals and the first and second IR presence signals from the wireless devices.

According to a second aspect, the present invention provides a wireless audio distribution system suitable for use in a classroom setting. The audio distribution system comprises a teacher microphone, a student microphone, and a wireless audio access point. The teacher microphone comprises a RF digital transceiver, a first IR transmitter adapted to transmit a first IR request inquiry signal and a first IR presence signal, and a microphone element. The student microphone comprises a RF digital transceiver, a second IR transmitter adapted to transmit a second IR request inquiry signal and a second IR presence signal, and a microphone element. The wireless audio access point comprises two RF digital transceivers and an IR sensor adapted to receive the first and second IR request inquiry signals and the first and second IR presence signals. The teacher microphone and the wireless audio access point establish wireless RF communication upon detection of the first IR request inquiry signal at the wireless audio access point. The wireless audio access point enables the audio output from teacher microphone upon receiving the first IR presence signal. The wireless audio access point mutes the audio output from the teacher microphone upon failing to receive the first IR presence signal. The student microphone and the wireless audio access point establish wireless RF communication upon detection of the second IR request inquiry signal at the wireless audio access point. The wireless audio access point enables the audio output from the student microphone upon receiving the second IR presence signal. The wireless audio access point mutes the audio output from the student microphone upon failing to receive the second IR presence signal.

According to a third aspect, the present invention provides a method for selectively distributing audio in a classroom using a wireless audio access point being capable of communicating over a first and second wireless RF channel and being capable of receiving a first and second IR request inquiry signals and a first and second IR presence signal. This method comprises the steps of: providing a first wireless microphone capable of communicating over the first wireless RF channel and transmitting IR signals; providing a second wireless microphone capable of communicating over the second wireless RF channel and transmitting IR signals; transmitting the first IR request inquiry signal from the first wireless microphone to the wireless audio access point; transmitting the second IR request inquiry signal from the second wireless microphone to the wireless audio access point; establishing wireless RF communication between the first wireless microphone and the wireless audio access point over the first wireless RF channel; establishing wireless RF communication between the second wireless microphone and the wireless audio access point over the second wireless RF channel; transmitting the first IR presence signal from the first wireless microphone to the wireless audio access point and second IR presence signal from the second wireless microphone to the wireless audio access point; conditionally muting audio from the first wireless microphone upon not receiving the first IR presence signal at the wireless audio access point; conditionally muting audio from the second wireless microphone upon not receiving the second IR presence signal at the wireless audio access point; conditionally enabling audio from the first wireless microphone upon receiving first IR presence signal at the wireless audio access point; and conditionally enabling audio from the second wireless microphone upon receiving the second IR presence signal at the wireless audio access point.

The present invention seeks to overcome or at least ameliorate one or more of several problems, including but not limited to using two wireless RF microphones in multiple classrooms.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Prior art

LIST OF REFERENCE NUMBERS FOR THE MAJOR ELEMENTS IN THE DRAWING

The following is a list of the major elements in the drawings in numerical order.

10 wireless radio frequency (RF) microphone
15 wireless audio access point
21 first classroom
22 second classroom
23 third classroom
24 fourth classroom
25 fifth classroom
26 sixth classroom
27 seventh classroom
28 eighth classroom
29 ninth classroom
30 teacher microphone
34 control switch (p/o teacher microphone 30)
40 student microphone
44 control switch (p/o student microphone 40)
50 wireless audio access point
51 first RF digital transceiver (p/o wireless audio access point 50)
52 second RF digital transceiver (p/o wireless audio access point 50)
53 infrared (IR) sensor (p/o wireless audio access point 50)
57 audio output circuitry (p/o wireless audio access point 50)
60 microphone
61 microphone RF digital transceiver
63 microphone IR transmitter
64 microphone control switch
67 microphone element
70 IR request inquiry signal
71 synchronization (p/o IR request inquiry signal 70)
72 microphone type (p/o IR request inquiry signal 70)
73 scalable address (p/o IR request inquiry signal 70)
74 error detection (p/o IR request inquiry signal 70)
75 third microphone
80 fourth microphone
100 Bluetooth RF communication link
101 RF inquiry
102 RF inquiry response
105 polling window gap 110 flowchart
111 (step of) transmitting an IR request inquiry signal
112 (step of) establishing RF communication link
113 (step of) transmitting an IR presence signal
114 (condition) is IR presence signal missing?
115 (step of) conditionally muting audio
116 (condition) is IR presence signal still missing?
117 (step of) conditionally enabling audio
120 polling window scheme
210 range of typical wireless RF device (from classroom 21)
300 first RF communication link (first channel)
331 first IR request inquiry signal (from teacher microphone 30)
332 first IR presence signal (from teacher microphone 30)
355 first polling window
400 second RF communication link (second channel)
431 second IR request inquiry signal (from student microphone 40)
432 second IR presence signal (from student microphone 40)
455 second polling window
705 third polling window
755 fourth polling window
P1 first pulse period
T1 first time period
T2 second time period
T3 third time period
T4 fourth time period
T5 fifth time period

DETAILED DESCRIPTION OF THE INVENTION

The embodiments of the present invention are described primarily in the context of a classroom audio distribution system that includes a number of wireless audio access points that may be in relatively close vicinity to one another and multiple wireless microphones. The wireless microphones and wireless audio access points establish an audio distribution system via infrared and radio frequency communication.

MODE(S) FOR CARRYING OUT THE INVENTION

Embodiments of the present invention are described herein in the context of devices and systems which are coupled using wireless links but are not limited thereto, except as may be set forth expressly in the appended claims.

Figure 3:
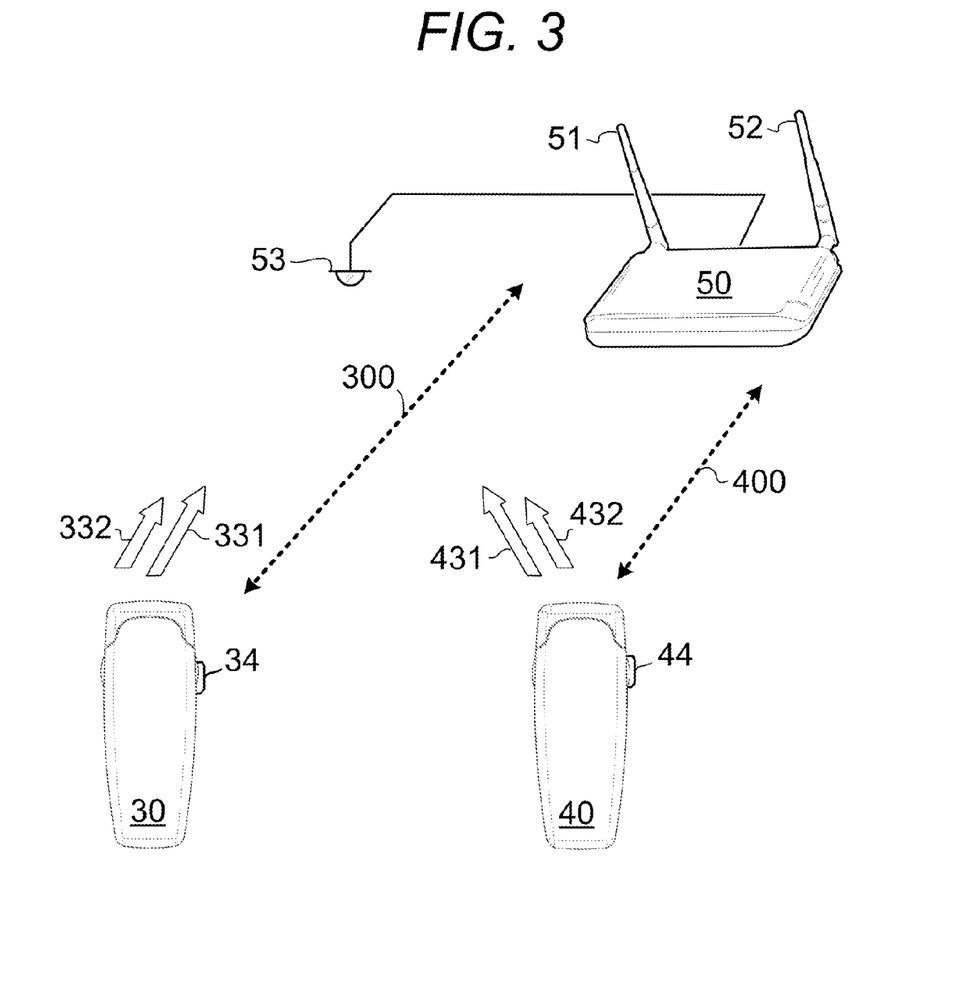
FIG. 3 depicts a classroom audio presentation system that uses two separate wireless RF microphones where each microphone further includes an infrared (IR) transmitter in accordance with a first illustrative embodiment of the present invention.

Refer first to FIG. 3 which shows a radio frequency (RF) audio distribution system including infrared (IR) presence detection in accordance with the present invention. The system includes a first wireless RF microphone, the "teacher" microphone 30, and a second wireless RF microphone, the "student" microphone 40. The two wireless microphones work in conjunction with a wireless communication access point, such as a "wireless audio access point" 50. This wireless audio access point 50 is located in a position within a classroom, such as mounted on a ceiling, so that it is generally in a line of sight with all interior portions of the classroom and out of a line of sight from the interior portions of other classrooms. For example, a wireless audio access point 50 mounted on the ceiling of a first classroom 21, as shown in FIG. 2, should not be visible to an occupant of a second classroom 22.

A first RF communication link 300 is established between the teacher microphone 30 and the wireless audio access point 50. First, a teacher activates a control switch 34 on the teacher microphone 30 which causes the teacher microphone 30 to emit a first IR request inquiry signal 331. Next, the wireless audio access point 50 detects this first IR request inquiry signal 331 at its IR sensor 53 and in response thereto transmits a RF inquiry message. Finally, the teacher microphone 30 responds with a RF inquiry response message using techniques known to those skilled in the art. Advantageously, this allows the teacher microphone 30 to only become discoverable to the wireless audio access point 50 for a very short time period. The first IR request inquiry signal 331 is particularly adapted to quickly establish RF communication between the teacher microphone 30 and the wireless audio access point 50. In a preferred embodiment, the first IR request inquiry signal 331 includes address and device type information.

A similar procedure is used to establish a second RF communication link 400 between the student microphone 40 and the wireless audio access point 50. First, a student activates a control switch 44 on the student microphone 40 which causes the student microphone 40 to emit a second IR request inquiry signal 431. Next, the wireless audio access point 50 detects this second IR request inquiry signal 431 at its IR sensor 53 and in response thereto transmits a RF inquiry message. Finally, the student microphone 40 responds with a RF inquiry response message using techniques known to those skilled in the art.

The teacher microphone 30 and student microphone 40 may establish simultaneous communication with the wireless audio access point 50 as they establish separate RF communication channels. Each microphone transmits audio to the wireless audio access point over its respective RF communication link. A classroom 21 equipped with the inventive RF audio distribution system described in FIG. 3 enables more effective communication between teacher and students and thus creates an environment more conducive to learning. The teacher microphone 30 helps the teacher convey her message more clearly and the student microphone 40 allows for improved class participation.

The student microphone 40 may be passed throughout the classroom as students take turns participating in the class discussion. Alternatively, those skilled in the art will recognize that a system of this type is not limited to two microphones. Alternative embodiments of the RF audio distribution system may employ multiple student microphones dispersed throughout a classroom. In addition, those skilled in the art will recognize that the teacher microphone 30 and student microphone 40 may be equipped with control buttons. Control buttons on the teacher microphone may provide the teacher the ability to selectively allow students to participate in class discussions by muting or enabling their microphones. In alternative embodiments of the invention students may use control buttons to mark their attendance, to answers interactive quizzes and polls, and to indicate willingness to volunteer.

During operation it is advantageous to determine whether the teacher 30 or student microphones 40 have been moved out of the present classroom. The wireless audio access point 50 detects the continued presence of the teacher microphone 30 and student microphone 40 by verifying that the microphone is within the same classroom as the IR sensor 53, by causing the teacher microphone 30 to transmit a first IR presence signal 332 and by causing the student microphone to transmit a second IR presence signal 432.

Those skilled in the art will recognize that the inventive technique of using an IR signal to establish a RF communication link to avoid having to remain discoverable to extraneous RF devices can be extended to other wireless communication systems and various other portable wireless devices.

Figure 4:
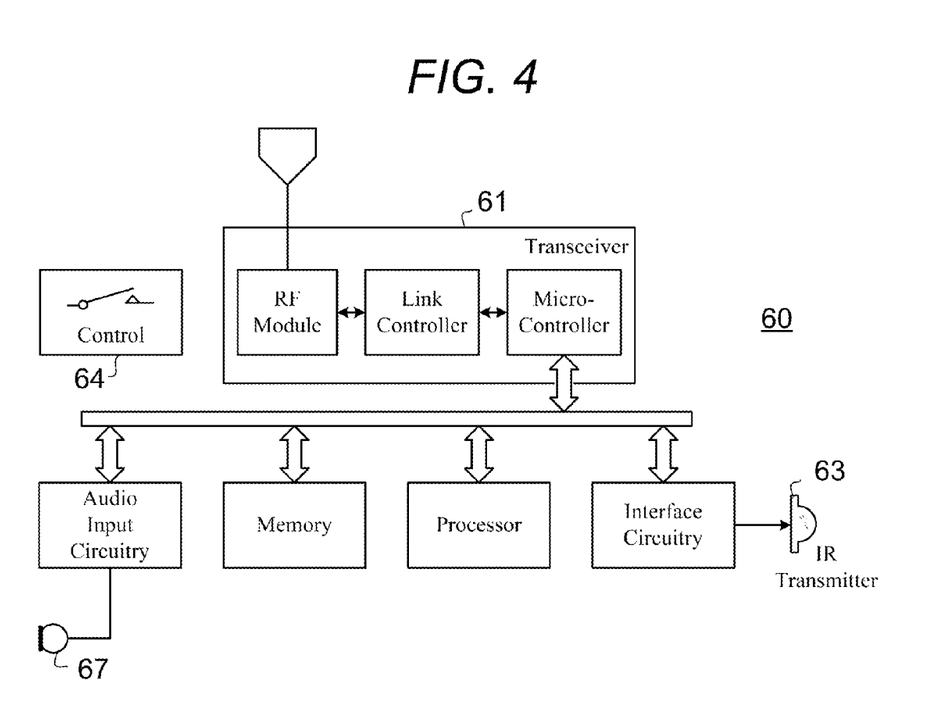
FIG. 4 is a block diagram of a wireless microphone with an IR transmitter suitable for use with the illustrative embodiment of FIG. 3.

Refer to FIG. 4 which shows an exemplary block diagram of certain functional blocks common to both the teacher microphone 30 and the student microphone 40. The primary functional blocks shown include a RF digital transceiver 61, an IR transmitter 63, and a control switch 64. In addition to these functional blocks, the microphones include an antenna associated with the RF digital transceiver 61, a microphone element 67 and associated audio input circuitry, and processing and memory elements typically found in modern electronic equipment.

Figure 5:
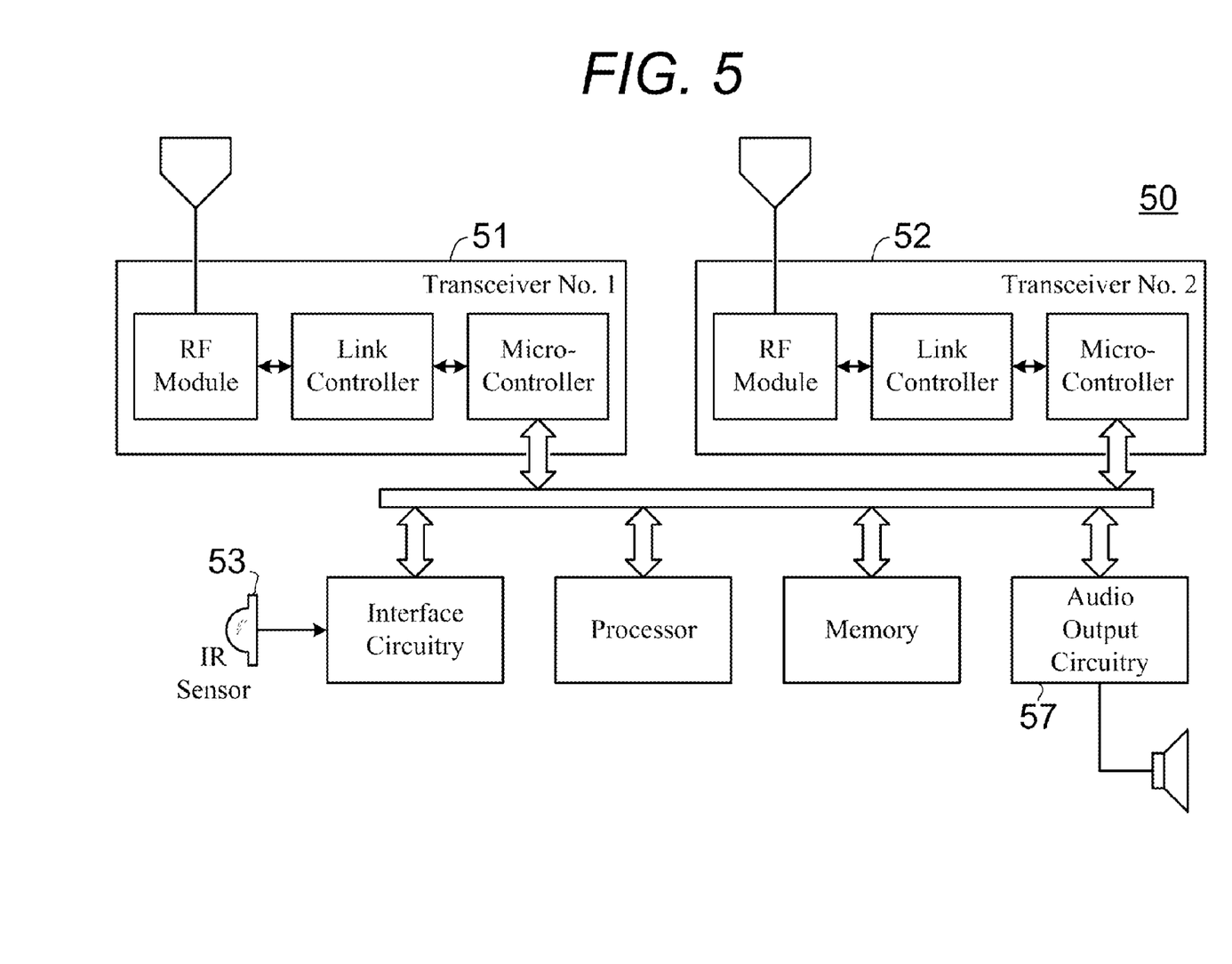
FIG. 5 depicts further details of a wireless audio access point suitable for use with the illustrative embodiment of FIG. 3.

Now refer to FIG. 5, which shows a block diagram of certain functional blocks within an exemplary wireless audio access point 50. The primary functional blocks shown include two separate RF digital transceivers 51 and 52 and an IR sensor 53 that provide the functionality previously described above. In addition to these functional blocks, the wireless audio access point 50 includes two antennas, each associated with a corresponding RF digital transceiver, audio output circuitry 57, and other processing and memory elements typically found in modern electronic equipment.

In the embodiment shown in FIG. 3, the first IR request inquiry signal 331 and second IR request inquiry signal 431 may be particularly adapted to quickly establish wireless RF communication between the wireless audio access point 50 and the teacher microphone 30 or student microphone 40. Particularly, by providing the microphone's scalable address in an IR request inquiry signal, the wireless audio access point may immediately begin the RF pairing process. The scalable address of the teacher microphone 30 or student microphone 40 is a unique pre-assigned value that identifies the particular microphone. Transmittal of the scalable address to the wireless audio access point 50 is a prerequisite for establishing a RF communication link between a microphone and the wireless audio access point 50. In addition to the scalable address, the IR request inquiry signals may also include information relating to microphone type, synchronization data and error detection or detection data.

Figure 6:
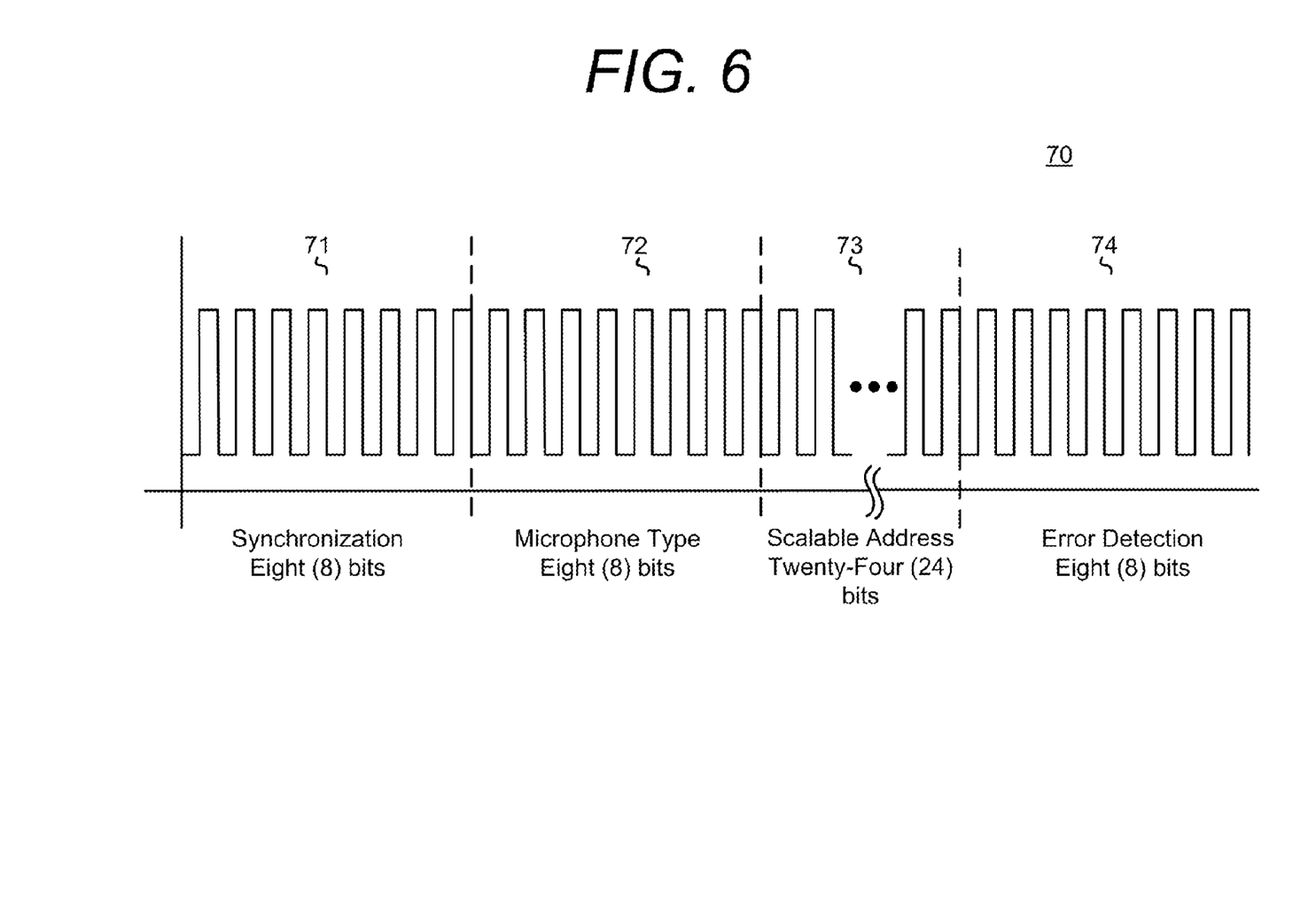
FIG. 6 illustrates an exemplary IR request inquiry signal useful for the illustrative embodiment shown in FIG. 3.

Refer now to FIG. 6, which illustrates the components of an exemplary IR request inquiry signal 70. The IR request inquiry signal 70 is comprised of forty-eight (48) bits, divided into four component bit strings. The first eight (8) bits 71 are a predetermined pattern used for time synchronization. The synchronization pattern is recognized by the wireless audio access point 50 and identifies to the wireless audio access point 50 that the signal is a valid IR request inquiry signal. The second eight (8) bits 72 identify the model type of the microphone transmitting the IR signal. Those skilled in the art will recognize that different models of microphones with different functions and attributes may be used in the RF audio distribution system. Each model is assigned an eight (8) bit identification number by the manufacturer and the IR request inquiry signal communicates this identification number to the wireless audio access point 50. The next twenty-four (24) bits 73 provide the wireless audio access point 50 with the microphone's 30 scalable address, as described above. The final eight (8) bits provide error detection data 74. Those skilled in the art will recognize that various error detection or error correction schemes may be used, such as by computing a checksum, a parity bit or a cyclic redundancy check.

Figure 7:
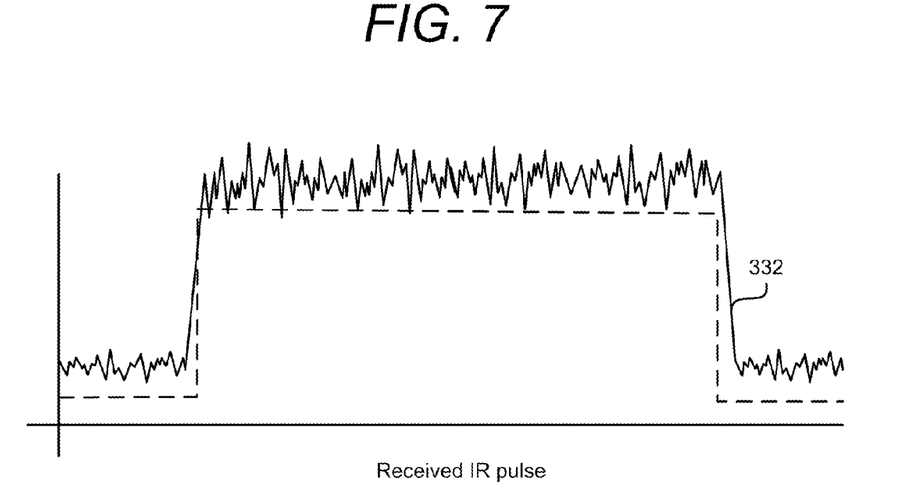
FIG. 7 depicts the first IR presence signal as received by the IR receiver of the wireless audio access point shown in the illustrative embodiment of FIG. 3.

Now refer to FIG. 7 which illustrates the first IR presence signal 332 as received by the IR sensor 53 of the wireless audio access point 50. Due to noise in the environment and the transmission properties of IR signals, the IR sensor 53 detects a noisy pulse, not a perfect square pulse. In embodiments of the present invention, the wireless audio access point 50 is designed to sense a rise in the intensity of IR light above the ambient noise. The IR sensor 53 of the wireless audio access point 50 continuously samples the light intensity at the wavelength of the IR signal and computes a running average of the background intensity for a relevant time period. The wireless audio access point 50 uses this background intensity average as a reference point to detect pulses of IR light above background levels, such as in an automatic gain control system.

Advantageously, because the IR sensor 53 is able to detect a noisy pulse, the RF audio distribution system does not require a direct line of sight between the IR transmitter 63 and IR sensor 53. The IR sensor 53 needs simply to detect a rise in IR light intensity to detect the first IR presence signal 332. As long as the teacher microphone 30 or student microphone 40 is collocated in a room with the wireless audio access point 50, the first IR presence signal 332 or second IR presence signal 432, respectively, will be detected by the IR sensor 53.

In an embodiment of the present invention, the teacher microphone 30 and the student microphone 40 transmit the first IR presence signal 332 and second IR presence signal 432 in response to requests from the wireless audio access point 50. The wireless audio access point 50 periodically sends this request to the teacher microphone 30 and student microphone 40 over the first RF communication link 300 or second RF communication link 400, respectively. The wireless audio access point 50 prompts one microphone at time as a means of distinguishing from which microphone an IR presence signal originated. After sending a request for an IR presence signal, the wireless audio access point 50 waits to detect an increase in IR light intensity above the background noise for a predetermined epoch of time.

In alternative embodiments of the invention, the teacher microphone 30 and student microphone 40 periodically transmit the first IR presence signal 332 and second IR presence signal 432 without a prompt from the wireless audio access point 50. To distinguish between the first IR presence signal 332 and second IR presence signal 432, the two presence signals have a distinguishing characteristic such as a unique value digitally encoded on the signal or a unique pulse period. This distinguishing characteristic may be preprogrammed in the microphone and communicated to the wireless audio access point 50 during the pairing process or it may be assigned by the wireless audio access point 50 during the initial pairing process.

Figure 8:
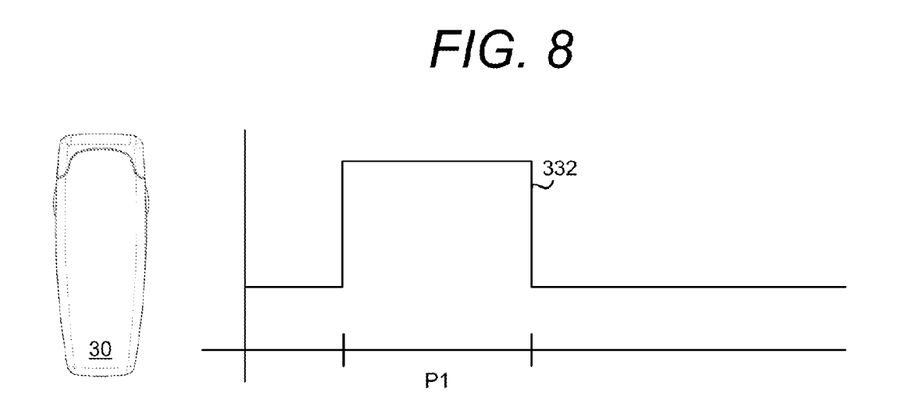
FIG. 8 depicts the first IR presence signal as transmitted by the IR receiver of the teacher microphone in accordance with a further embodiment of the present invention.

Now refer to FIG. 8 which depicts the first IR presence signal 331 having a first pulse period P1 as transmitted by the teacher microphone (30). In alternative embodiments of the present invention as described above, the wireless audio access point 50 assigns a different pulse period to the teacher microphone 30 and the student microphone 40 in order to distinguish from which microphone a received IR presence signal originated. For example, the wireless audio access point 50 may assign the first pulse period P1 to the teacher microphone 30 and a second pulse period to the student microphone 40. The teacher microphone 30 would then periodically transmit the first IR presence signal 332 for the first pulse period P1 without prompt from the wireless audio access point 50. The student microphone would periodically transmit the second IR presence signal 432 for the second pulse period without prompt from the wireless audio access point 50. The wireless audio access point 50 determines which microphones are collocated in a room with it by distinguishing between the pulse periods of the IR presence signals.

Figure 9:
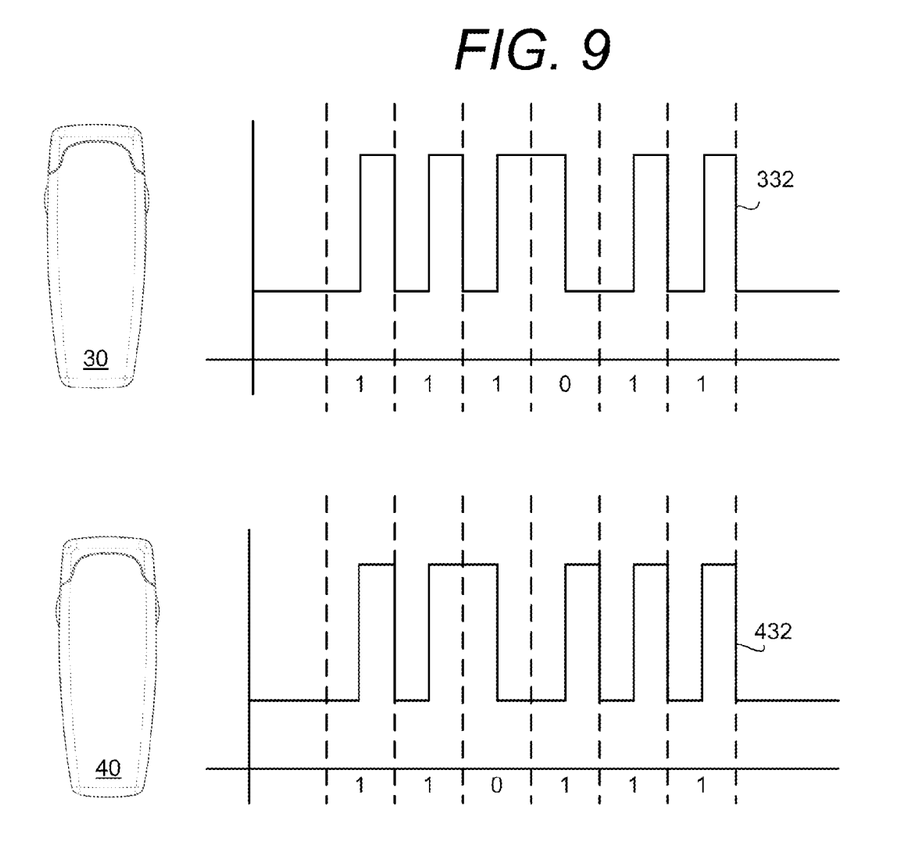
FIG. 9 depicts a first IR presence signal and a second IR presence signal, each having a different digitally encoded value in accordance with an additional further embodiment of the present invention.

Refer now to FIG. 9 which illustrates the first IR presence signal 332 and second IR presence signal 432 having different values digitally encoded thereon. In an alternative embodiment of the present invention, the wireless audio access point 50 assigns a first value to the teacher microphone 30 and a second value to the student microphone 40 during the initial pairing process. The teacher microphone 30 digitally encodes this first value onto the first IR presence signal 332 and the student microphone 40 digitally encodes the second value onto to the second IR presence signal 432. The teacher microphone 30 and student microphone 40 transmit their IR presence signals periodically with no prompt from the wireless audio access point 50. The wireless audio access point 50 determines which microphone is collocated in a room with it by distinguishing between the values digitally encoded on the IR presence signals. Those skilled in the art will recognize that the teacher microphone 30 or student microphone 40 will now require a direct line of sight to the wireless audio access point 50 for the IR sensor 53 to discern the digital transitions of their respective IR presence signal.

Figure 10:
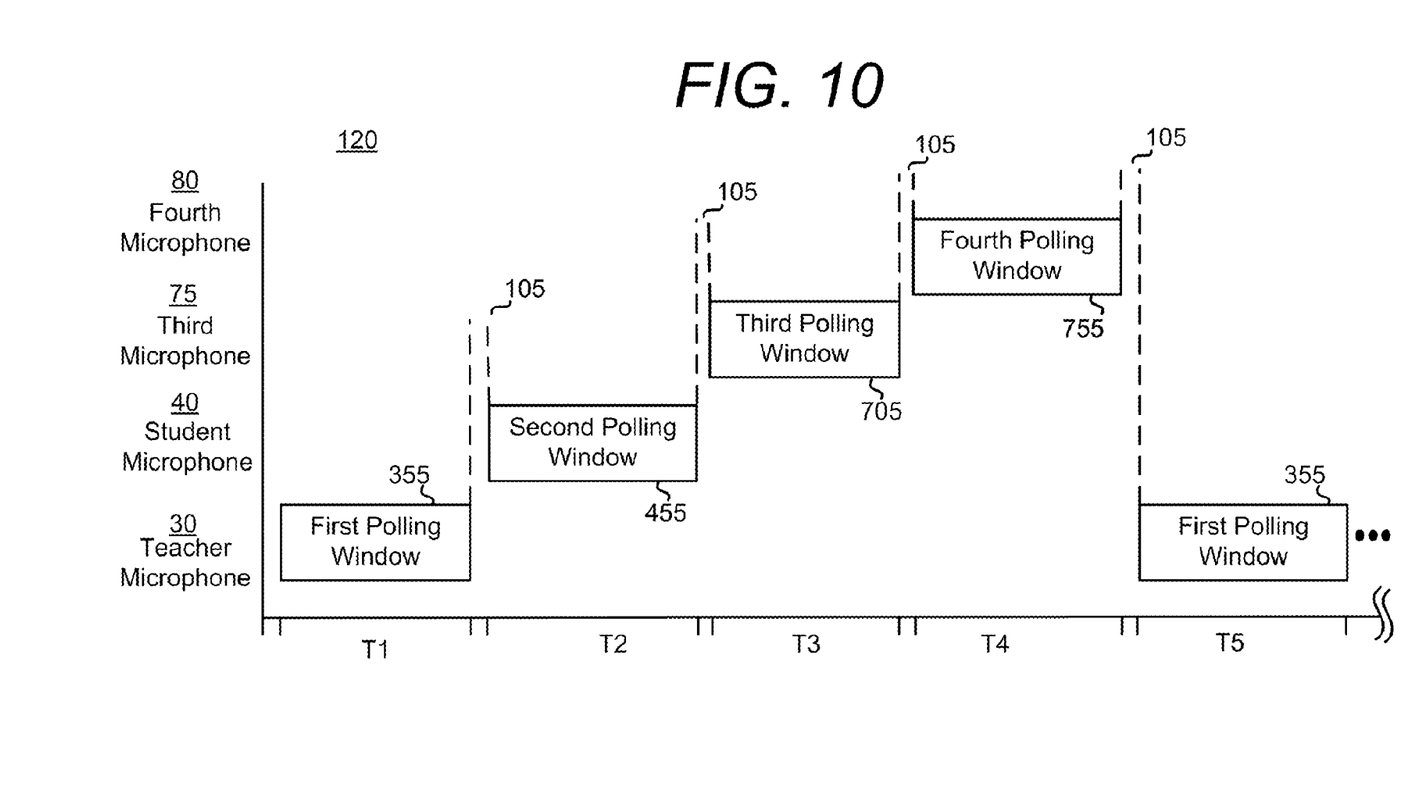
FIG. 10 depicts a timing chart showing polling windows assigned to four microphones, which is suitable for use in an embodiment of the present invention.

In an embodiment of the present invention, the wireless audio access point 50 sets a polling window scheme 120 for the microphones to follow. FIG. 10 depicts a timing chart showing the polling window assigned to each microphone. The timing chart depicted in FIG. 10 pertains to a wireless audio distribution system comprising a teacher microphone 30, a student microphone 40, a third microphone 75, and a fourth microphone 80. In the polling window scheme 120, a predetermined time period is divided into a number of polling windows corresponding to the number of microphones present in the wireless audio distribution system. In the polling window scheme 120 illustrated in FIG. 10, the predetermined time period is divided into a first polling window 355, a second polling window 455, a third polling window 705, and a fourth polling window 755. There is a polling window gap 105 after each polling window. For example, if the predetermined time period of the polling window scheme is five (5) minutes. The wireless audio access point 50 may divide the five (5) minute time period into four (4) polling windows, each one (1) minute long with four polling window gaps 105 of fifteen (15) seconds.

The teacher microphone 30 is assigned the first polling window 355 by the wireless audio access point 50 and may only transmit the first IR presence signal 332 during this first polling window 355. There is no longer a need to differentiate IR presence signals by microphone because only the teacher microphone may transmit an IR presence signal during the first presence signal window and all IR presence signals received by the wireless audio access point 50 during the first polling window 355 are attributed to the teacher microphone 41. Similarly, as assigned by the wireless audio access point 50, the second polling window 455 is the exclusive domain for the student microphone 40 to transmit an IR presence signal, the third polling window 705 is the exclusive domain for a third microphone 75 to transmit an IR presence signal, and the fourth polling window 755 is the exclusive domain for a fourth microphone 80 to transmit an IR presence signal. After the fourth polling window 755 has elapsed, the polling window scheme repeats 120 as necessary. Therefore each microphone transmits one IR presence signal for each iteration of the polling window scheme 120.

The polling window scheme 120 may be assigned by the wireless audio access point 50 to accommodate particular schedules. For example, in a school setting, the entire sequence may repeat every five (5) minutes to ensure that a new iteration begins at the start of every hour, a common time for class periods to begin. The time period may be set at a shorter interval to take into account applications where microphones quickly move into and out of classrooms. In addition, the number of polling windows may be set at a preconfigured number or it may vary depending on the number of microphones.

Figure 11:
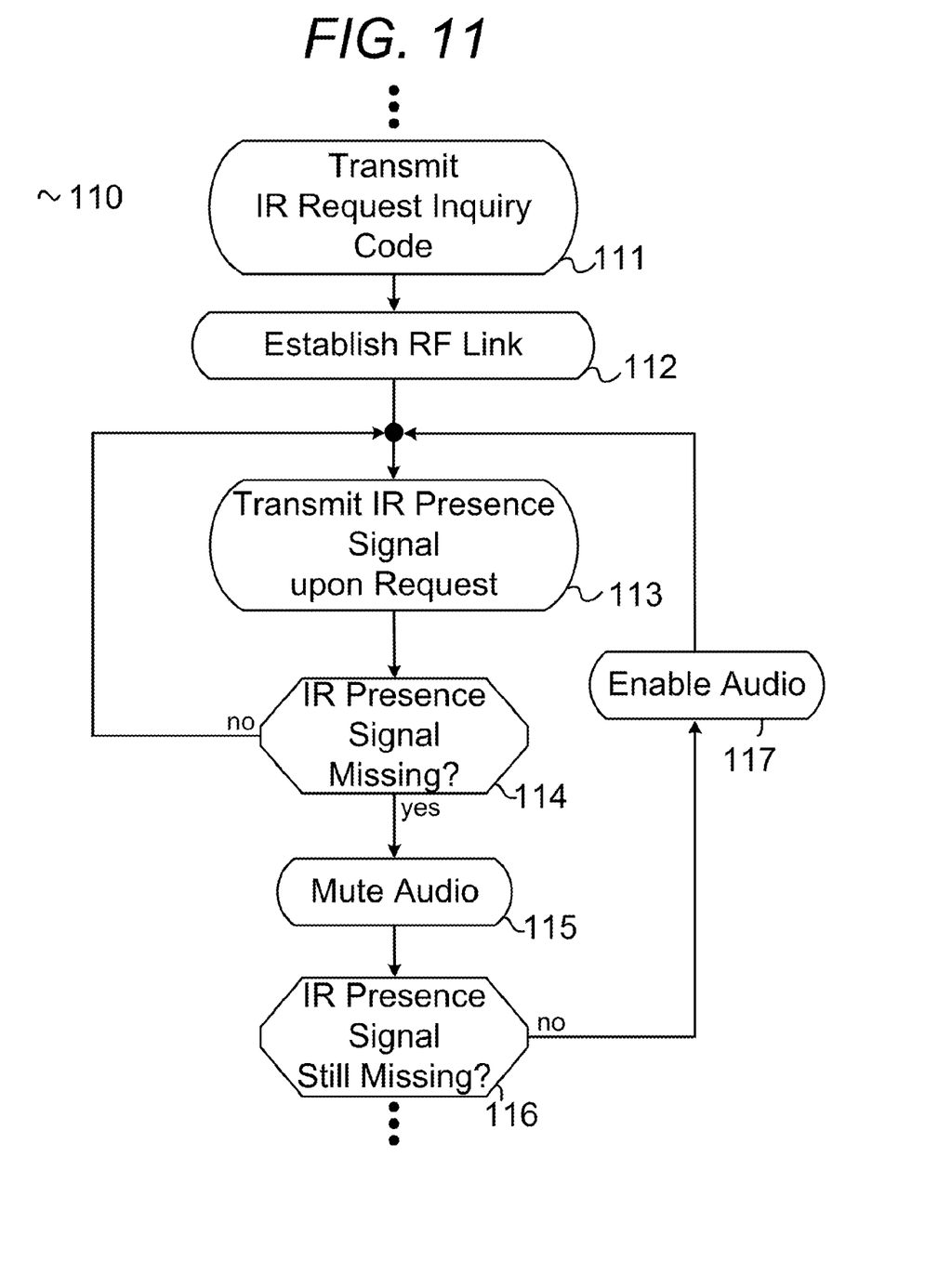
FIG. 11 is a flowchart of an innovative process for managing RF communications between two wireless microphones and a wireless audio access point based on the presence of IR signals.

FIG. 11 shows a process flowchart 110 for selectively communicating with a student microphone 30 and a teacher microphone 40 as they move throughout a school. Those skilled in the art will recognize that the present invention is also suitable for use in other predefined areas, such as, but not limed to: conference centers and hotels. According to the present invention, the predefined area includes a number of wireless audio access points within the area.

Flowchart 110 includes processes of the present invention which, in one embodiment, are carried out by a processor and electrical components under the control of computer readable and computer executable instructions. The computer readable and computer executable instructions may reside, for example, in data storage features such as computer usable memory or in any other type of computer readable medium. Although specific steps are disclosed in flowchart 110, such steps are exemplary. That is, the present invention is well suited to performing various other steps or variations of the steps recited in FIG. 11. Within the present embodiment, it should be appreciated that the steps of flowchart 110 can be performed by software or hardware or any combination of software and hardware.

Refer now to FIG. 11 and refer back to FIG. 4. According to an illustrative embodiment of the present invention, a first RF communication link 300 is established between the teacher microphone 30 and the wireless audio access point (step 112) only after the teacher microphone 30 has transmitted (step 111) a first IR request inquiry signal 331 and this IR signal has been received at the wireless audio access point 50. Establishing (step 112) the first RF communication link 300 entails the wireless audio access point 50 transmitting a RF inquiry message and the teacher microphone 30 transmitting a RF inquiry response message. As described above, the IR signal may be transmitted (step 111) in response to an operator action.

A second RF communication link 400 is established between the student microphone 40 and the wireless audio access point 50 in a manner similar to that of the first RF communication link 300. The second RF communication link 400 is established only after the student microphone 40 has transmitted (step 111) a second IR request inquiry signal 431 and this second IR request inquiry signal 431 has been received at the wireless audio access point 50. Establishing (step 112) the second RF communication link 400 entails the wireless audio access point 50 transmitting a RF inquiry message and the student microphone 40 transmitting a RF inquiry response message.

In a preferred embodiment of the present invention, the teacher microphone 30 transmits (step 113) a first IR presence signal 332 and the student microphone 40 transmits (step 113) a second IR presence signal 432 upon request. Advantageously, due to the propagation nature of the IR signal this allows the wireless audio access point 50 to determine whether the student microphone or the teacher microphone are within the confines of the same classroom.

Those skilled in the art will recognize it is desirable to conditionally mute the audio from the wireless microphones when, for example a teacher giving a lecture in a first classroom steps out of that classroom. Accordingly, to determine whether the teacher microphone 30 is still collocated; the wireless audio access point 50 periodically requests that the teacher microphone 30 transmit (step 113) the first IR presence signal 332. If the first IR presence signal 332 is not received (i.e. 'missing') at the wireless audio access point 50 and more specifically at IR Sensor 53, then the audio from the teacher microphone 30 is muted (step 115). Note that the associated audio data stream is still being transmitted from the teacher microphone 30 to the wireless audio access point 50, but is being muted in the audio output circuitry 57, shown in FIG. 5.

Next, the wireless audio access point 50 continues to request for the teacher microphone 30 to transmit the first IR presence signal 332. In certain embodiments the wireless audio access point 50 will request that the first IR presence signal 332 be transmitted at a 'high power' setting to aid collocation. If, after periodic retries, requests for higher power settings, and the like, the first IR presence signal 332 is now detected, then the audio from teacher microphone 30 is enabled (step 117).

The wireless audio access point 50 manages communication with the student microphone 40 in a similar manner. To determine whether the student microphone 40 is still collocated; the wireless audio access point 50 periodically requests that the student microphone 40 transmit (step 113) the second IR presence signal 432. If the second IR presence signal 432 is not received (i.e. 'missing') at the wireless audio access point 50 and more specifically at IR Sensor 53, shown in FIG. 5, then the audio from the student microphone 40 is conditionally muted (step 115). Note that the associated audio data stream is still being transmitted from the student microphone 40 to the wireless audio access point 50, but is being muted in the audio output circuitry 57, shown in FIG. 5.

Next, the wireless audio access point 50 continues to request that the student microphone 40 transmit the second IR presence signal 432. In certain embodiments the wireless audio access point 50 will request that the second IR presence signal 432 be transmitted at a 'high power' setting so that collocation can be determined even if the IR transmitter 423 is not in a direct line-of-sight with the IR sensor 53. If, after periodic retries, requests for higher power settings, and the like, the second IR presence signal 432 is now detected, then the audio from student microphone 40 is enabled (step 117).

Those skilled in the art will realize that it is beneficial to conditionally mute and enable audio from the student microphone 40 depending on whether the student is collocated with a wireless audio access point 50. Audio will cease to be distributed if the student is no longer in the classroom to avoid extraneous conversations from being broadcast to the classroom. Additionally, by conditionally enabling only those microphones that are collocated in the same room as the wireless audio access point 50, students may have personal microphones that are operable in multiple classrooms as opposed to having microphones assigned to a specific room.

In summary, embodiments of the present invention provide a user-friendly system and method for using two wireless microphones in multiple classrooms while monitoring whether the wireless microphones are collocated in a classroom with a wireless audio access point while preventing undesired or extraneous audio.

INDUSTRIAL APPLICABILITY

To solve the aforementioned problems, the present invention includes a method for intelligently selecting a wireless RF access point from a plurality of available points.

LIST OF ACRONYMS USED IN THE DETAILED DESCRIPTION OF THE INVENTION

The following is a list of the acronyms used in the specification in alphabetical order.

IEEE Institute of Electronic and Electrical Engineers
IR infrared
ms millisecond
RF radio frequency
VoIP Voice over Internet Protocol

ALTERNATE EMBODIMENTS

Alternate embodiments may be devised without departing from the spirit or the scope of the invention. For example, certain embodiments may use digital RF communication protocols such as Bluetooth or Wi-Fi Direct or other audio transmission methods such as Voice over Internet Protocol (VoIP).

What is claimed is:

1. A wireless communication system comprising:
   (a) a first portable wireless device (30) that further comprises
      (i) a RF digital transceiver,
      (ii) a first IR transmitter adapted to transmit a first IR request inquiry signal (331) and a first IR presence signal (332);
   (b) a second portable wireless device (40) that further comprises
      (i) a RF digital transceiver,
      (ii) a second IR transmitter adapted to transmit a second IR request inquiry signal (431) and a second IR presence signal (432); and
   (c) a wireless communication access point (50) that further comprises
      (i) a first RF digital transceiver (51) adapted to communicate with said first portable wireless device,
      (ii) a second RF digital transceiver (52) adapted to communicate with said second portable wireless device, and
      (iii) an IR sensor adapted (53) to receive said first and second IR request inquiry signals and said first and second IR presence signals;
   wherein the first portable wireless device and the first RF digital transceiver establish mutual communication only after the first IR request inquiry signal is detected at the wireless communication access point; and the second portable wireless device and the second RF digital transceiver establish communication only after the second IR request inquiry signal is detected at the wireless communication access point.

2. The wireless communication system of claim 1 wherein the wireless communication access point is configured to manage RF frequency digital communication based on said first and second IR request inquiry signals and said first and second IR presence signals.

3. The wireless communication system of claim 2 wherein the wireless communication access point is further configured to determine whether it is collocated in a room with the first portable wireless device.

4. The wireless communication system of claim 2 wherein the wireless communication access point is further configured to determine whether it is collocated in a room with the second portable wireless device.

5. The wireless communication system of claim 1 wherein the first and second IR request inquiry signals and the first and second IR presence signals substantially comply with RC-5 IR protocol.

6. The wireless communication system of claim 5 wherein the first portable wireless device transmits the first IR presence signal during a first polling window assigned by the wireless communication access point.

7. The wireless communication system of claim 5 wherein the second portable wireless device transmits the second IR presence signal during a second polling window assigned by the wireless communication point.

8. The wireless communication system of claim 1 wherein the first and second IR request inquiry signals each comprise a scalable device address and a wireless device model number.

9. The wireless communication system of claim 1 wherein the first IR presence signal is transmitted in response to a first request from the wireless communication access point.

10. The wireless communication system of claim 1 wherein:
(a) the first portable wireless device further comprises a microphone element and is further adapted to transmit audio;
(b) the second portable wireless device further comprises a microphone element and is further adapted to transmit audio; and
(c) the wireless communication access point further comprises audio output circuitry (57) and the first RF digital transceiver and second RF digital transceiver are further adapted to receive audio.

11. The wireless communication system of claim 10 wherein:
(a) the wireless communication access point is further adapted to mute an audio output from the first portable wireless device upon a predetermined condition of failing to receive said first IR presence signal; and
(b) the wireless communication access point is further adapted to mute an audio output from the second portable wireless device upon a predetermined condition of failing to receive said second IR presence signal.

12. The wireless communication system of claim 10 wherein:
(a) the wireless communication access point is further adapted to enable an audio output from the first portable wireless device upon a predetermined condition of receiving said first IR presence signal; and
(b) the wireless communication access point is further adapted to enable an audio output from the second portable wireless device upon a predetermined condition of receiving said second IR presence signal.

13. The wireless communication system of claim 1 wherein the second IR presence signal is transmitted in response to a second request from the wireless communication access point.

14. The wireless communication system of claim 1 wherein the first and second IR presence signals are transmitted periodically.

15. The wireless communication system of claim 14 wherein:
(a) the first IR presence signal has a first recognized digital code; and
(b) the second IR presence signal has a second recognized digital code.

16. The wireless communication system of claim 14 wherein:
(a) the first IR presence signal has a first recognized pulse period; and
(b) the second IR presence signal has a second recognized pulse period.

17. A method for selectively distributing audio in a classroom using a wireless audio access point capable of communicating over first and second wireless RF channels and capable of receiving first and second IR request inquiry signals and first and second IR presence signals, said method comprising the steps of:
(a) providing a first wireless microphone capable of communicating over the first wireless RF channel and capable of transmitting IR signals;
(b) providing a second wireless microphone capable of communicating over the second wireless RF channel and capable of transmitting IR signals;
(c) transmitting (step 111) the first IR request inquiry signal from the first wireless microphone to the wireless audio access point;
(d) transmitting the second IR request inquiry signal from the second wireless microphone to the wireless audio access point
(e) establishing (step 112) wireless RF communication between the first wireless microphone and the wireless audio access point over the first wireless RF channel;
(f) establishing wireless RF communication between the second wireless microphone and the wireless audio access point over the second wireless RF channel;
(g) transmitting (step 113) the first IR presence signal from the first wireless microphone to the wireless audio access point;
(h) transmitting the second IR presence signal from the second wireless microphone to the wireless audio access point;
(i) conditionally muting (step 115) audio from said first wireless microphone upon not receiving the first IR presence signal, at the wireless audio access point (condition 114);
(j) conditionally muting audio from said second wireless microphone upon not receiving the second IR presence signal, at the wireless audio access point;
(k) conditionally enabling (step 117) audio from said first wireless microphone upon receiving the first IR presence signal at the wireless audio access point (condition 116); and
(l) conditionally enabling audio from said second wireless microphone upon receiving the second IR presence signal at the wireless audio access point.

18. The method according to claim 17 wherein the first and second IR presence signals are transmitted periodically.

19. The method according to claim 18 wherein the first wireless microphone transmits the first presence signal during a first polling window and the second wireless microphone transmits the second presence signal during a second polling window.

20. The method according to claim 17 wherein the first and second IR presence signals are transmitted upon request from the wireless audio access point.

21. The method according to claim 17 further comprising the steps of:
(a) conditionally terminating RF communication on the first wireless RF channel upon not receiving the first IR presence signal at wireless audio access point;
(b) conditionally terminating RF communication on the second wireless RF channel upon not receiving the second IR presence signal at wireless audio access point;
(c) conditionally reestablishing RF communication on the first wireless RF channel upon receiving the first IR presence signal at the wireless audio access point; and
(d) conditionally reestablishing RF communication on the second wireless RF channel upon receiving the second IR presence signal at the wireless audio access point.

* * * * *